United States Patent [19]

Scholefield et al.

[11] Patent Number: 5,742,592
[45] Date of Patent: Apr. 21, 1998

[54] METHOD FOR COMMUNICATING DATA IN A WIRELESS COMMUNICATION SYSTEM

[75] Inventors: Christopher Scholefield, Delta; Ronald H. Gerhards, Vancouver, both of Canada

[73] Assignee: Motorola, Inc., Schaumburg, Ill.

[21] Appl. No.: 522,649

[22] Filed: Sep. 1, 1995

[51] Int. Cl.$^6$ ............................. H04Q 7/20; H04J 3/24
[52] U.S. Cl. .......................... 370/329; 370/349; 370/442
[58] Field of Search ................................. 370/319, 321, 370/322, 326, 329, 336, 337, 347, 348, 349, 439, 442, 443, 444, 461, 462, 468, 479, 524, 913

[56] References Cited

U.S. PATENT DOCUMENTS

| | | | |
|---|---|---|---|
| 4,745,599 | 5/1988 | Raychaudhuri | 370/93 |
| 5,161,194 | 11/1992 | Ujiie | 380/48 |
| 5,260,989 | 11/1993 | Jennes et al. | 379/59 |
| 5,440,545 | 8/1995 | Buchholz et al. | 370/60 |
| 5,555,266 | 9/1996 | Buchholz | 370/95.1 |
| 5,583,869 | 12/1996 | Grube et al. | 370/347 |
| 5,606,561 | 2/1997 | Scheibel | 370/347 |
| 5,648,967 | 7/1997 | Schulz | 370/328 |

*Primary Examiner*—Douglas W. Olms
*Assistant Examiner*—Matthew C. Phillips
*Attorney, Agent, or Firm*—J. Ray Wood

[57] ABSTRACT

The disclosed system is capable of allocating plural subchannels based on user data priority. In one embodiment, a subscriber determines the throughput it would like and fragments a data packet in that number of service data units, and requests that number of subchannel allocations from a serving base station. Upon receipt of the access request(s), including any priority indicators, the system determines from the access request(s) whether to allocate the subchannel(s) to the subscriber. Further access requests are received periodically and scheduled, and when a higher priority message is received, completion of a lower priority message is deferred and the higher priority request allocated. Thus, an improved access procedure is provided accommodating varying throughput rates with a more robust transfer because of the packet fragmentation and multiple-subchannel transfer.

12 Claims, 6 Drawing Sheets

FIG. 8
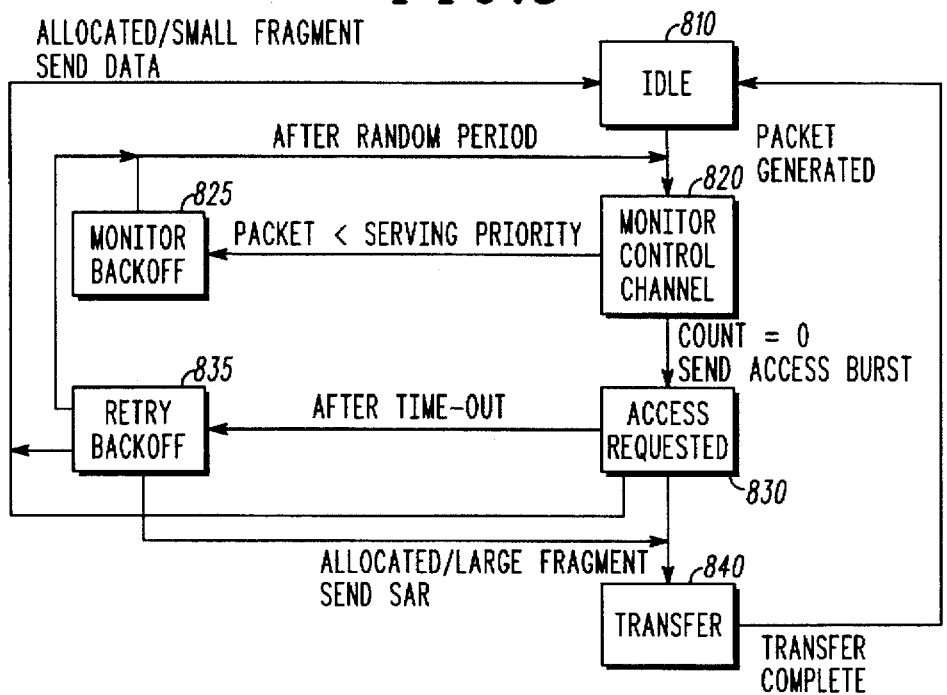
FIG. 9
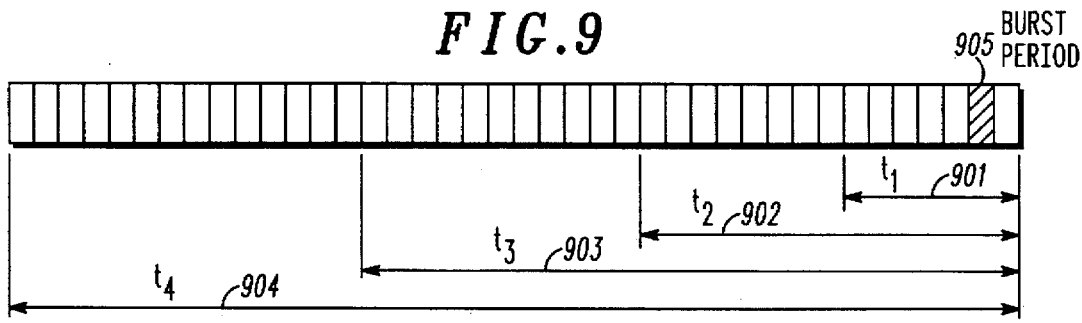
$t_1$: PRIORITY 1 ACCESS REQUEST PERIOD
$t_2$: PRIORITY 2 ACCESS REQUEST PERIOD
$t_3$: PRIORITY 3 ACCESS REQUEST PERIOD
$t_4$: PRIORITY 4 ACCESS REQUEST PERIOD
FIG. 10
| | P-PERSISTENCE PARAMETERS | |
|---|---|---|
| PRIORITY (n) | $P_n$ | $W_n = 1/P_n$ |
| 1 | .05 | 20 |
| 2 | .03 | 33 |
| 3 | .025 | 40 |
| 4 | .02 | 50 |

METHOD FOR COMMUNICATING DATA IN A WIRELESS COMMUNICATION SYSTEM

FIELD OF THE INVENTION

The present invention relates to communications and more particularly an improved method for communicating data in a wireless communications system.

BACKGROUND

The last 10 years has seen a tremendous increase in the demand for wireless networks capable of handling data communications. Unlike voice services, such as the GSM (Global System for Mobiles) cellular service, in which circuit-switched communications are used because of the sensitivity of users to the timing of oral dialogue, greater efficiencies can be achieved in data communications through the use of packet-switched and hybrid communications. Thus, it is anticipated that a significantly increased throughput can be achieved for shorter traffic by using proposed services such as the GPRS (GSM Packet Radio Service) over traditional circuit-switched wireless technology.

However, with the increased demand for wireless services has also come a demand for higher throughput rates of data traffic, at least for some users. One proposed solution to this need is the use of "quality of service" (QOS) grades for data traffic. By designating a particular data message with a high QOS grade or priority, users who have the need for rapid end-to-end delivery of their data will have their data delivered ahead of lower QOS data. On the other hand, users who do not want to pay the higher QOS rates and can tolerate longer end-to-end delays can designate their data traffic with a lower QOS grade.

Two key problems in implementing this type of service for wireless data communications are delays in obtaining access to a wireless channel, and limited throughput due to the limited bandwidth of wireless channels. The first problem arises because there are only a limited number of channels (or in the case of TDMA (time division multiple access) systems like GSM, subchannels/time slot sets) available for any given base station service area. Any delay in access will mean a decrease in the time the subchannels are available for actual data transmissions. Further, as the system approaches peak loading, there may well be many more mobile stations (MSs, or more generally subscriber units) attempting to gain access than can be accommodated by the system.

In order to reduce this access delay a number of medium access control (MAC) protocols have been proposed for wireless systems, including ALOHA, Slotted-ALOHA, reservation ALOHA, CSMA (Carrier-Sense Multiple Access), DSMA (Digital-Sense Multiple Access), PRMA (Packet Reservation Multiple Access) and QCRA (Queued Contiguous Reservation Aloha). However, all of these protocols have a limitation in that all of them allocate single channels to a mobile station for a continuous period of time (or in TDMA systems, a continuous subchannel, i.e., a series of time slots) until the data transfer is complete. Thus, any new user, even one having a higher priority, has to wait until the end of the current users message. Further, no provision is made for deferring a lower priority message, either one waiting to be sent or only partially sent, since those subscribers not receiving an allocation need to contend again for access to the channel when it next becomes available.

The second problem, limited throughput, is particularly noticeable in TDMA systems. For example, in current GSM systems the maximum throughput for packet data is 9.6 kbps with error correction, or higher without, because only about 33 kbps raw transmission rate is possible for a burst given the standardized bit rate of 270.833 kbps and 0.577 ms (millisecond) for each of the eight time-slot periods. To improve this throughput, one proposal has been to allow for the use of multiple subchannels (e.g., 2 or more time slots per frame), thus effectively doubling or more the throughput rate. A drawback to this approach is that environmental factors such as fading often last longer than a single time slot, although most fades in moving subscribers will be over within a frame period. Under the prior approach, a given fade only stands to corrupt a single time slot period of data, while under the proposed approach a fade may corrupt 2 or more time-slot periods of data in a row. This in turn increases the likelihood that any error correction coding will be unable to successfully recover the received packet, thus leading to an increase in ARQs (automatic repeat requests) and overall decrease in the throughput rate.

There remains therefore a need for an improved means for data communications in wireless systems that solves these and related problems.

BRIEF DESCRIPTION OF THE DRAWINGS

FIG. 8 is a state diagram illustrating transition states for access of the subscriber unit in the wireless communications system of FIG. 1;

FIG. 9 is a diagram illustrating an uplink multiframe structure according to the second embodiment of the invention; and FIG. 10 is a table illustrating access control parameters for use with the second embodiment of the invention.

DETAILED DESCRIPTION

These problems and others are solved by the improved method and apparatus according to the invention. A presently preferred embodiment of the invention is a system for allocating one or more subchannels based on priority of user data. After receiving a control message including a current priority service level message from a base station, a subscriber unit determines whether or not to send an access request for one or more subchannels. Upon receipt of an allocation/access request, the system infrastructure determines from the access request whether to allocate the subchannel(s) to the subscriber unit. Periodically further access requests are received and scheduled and, when a higher priority message is received, completion of a lower priority message is deferred and the higher priority request allowed to proceed. Thus, an improved access procedure is provided that allows for quicker access times as the priority of the data traffic increases. In a further embodiment, plural subchannels are requested and, when allocated, a data packet is fragmented into plural data units and each data unit sent via a different subchannel. Because the effect of the fragmenting and transmission on different subchannels is similar to that of interleaving the original data packet, a more robust and higher throughput can be achieved with the present invention.

Figure 1:
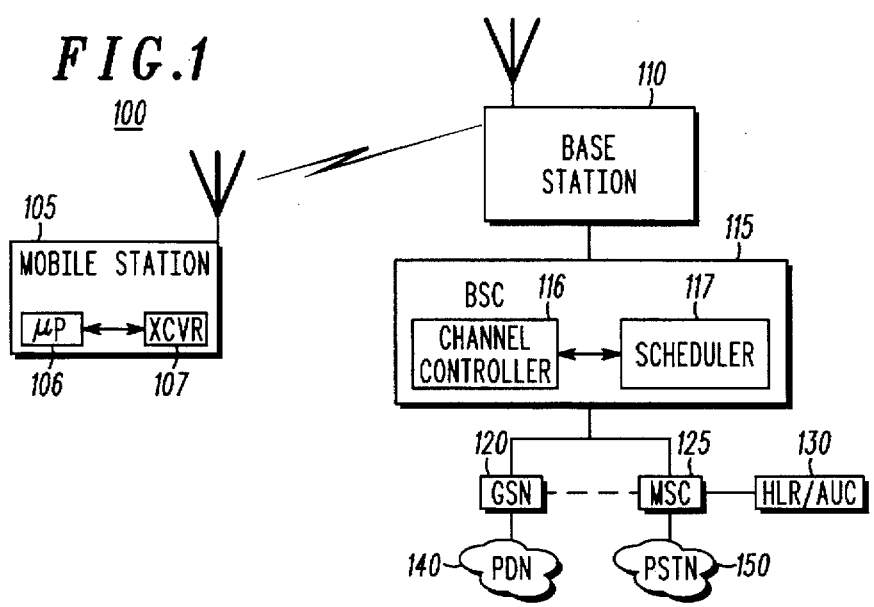
FIG. 1 is a block diagram of a wireless communications system according to first and second embodiments of the invention.

Turning now to FIG. 1, there is generally depicted a wireless communications system 100 having one or more subscriber units (i.e., mobile station (MS) 105) communicating via a base station (BS) 110 and base station controller (BSC) 115. The subscriber unit may be of such diverse types as dedicated data units (e.g., personal digital assistants (PDAs)), radiotelephones adapted for coupling with data terminals (e.g., portable computers), or wireless adapter devices (e.g., wireless modems adapted for coupling with computers, message pads, etc.), and the like. In any event, the subscriber unit includes a transceiver 107 and processor 106 appropriately programmed for wireless data communications according to a serving systems protocols. In the illustrated case a combined GPRS-GSM system is shown, although it will be recognized that the embodiments discussed herein are equally applicable to any other wireless communications system, including CDPD (cellular digital packet data), CDMA (code division multiple access), and data systems like ARDIS or RAM. Thus, the portion of the GSM system servicing voice subscribers includes an MSC (mobile switching center) 125 connected to an HLR/AuC (home location register/authentication center) 130 and PSTN (public switched telephone network) 150. The GPRS portion includes a GSN (GPRS service node) 120 connected to a packet switched PDN (public data network). GSN 120 includes all information necessary for appropriate routing of data messages; it may alternatively be coupled to MSC 125 to allow access to higher layer user information stored at a common platform such as HLR 130. BSC 115 includes a channel controller 116 and scheduler 117, along with typical BSC circuitry.

Figure 2:
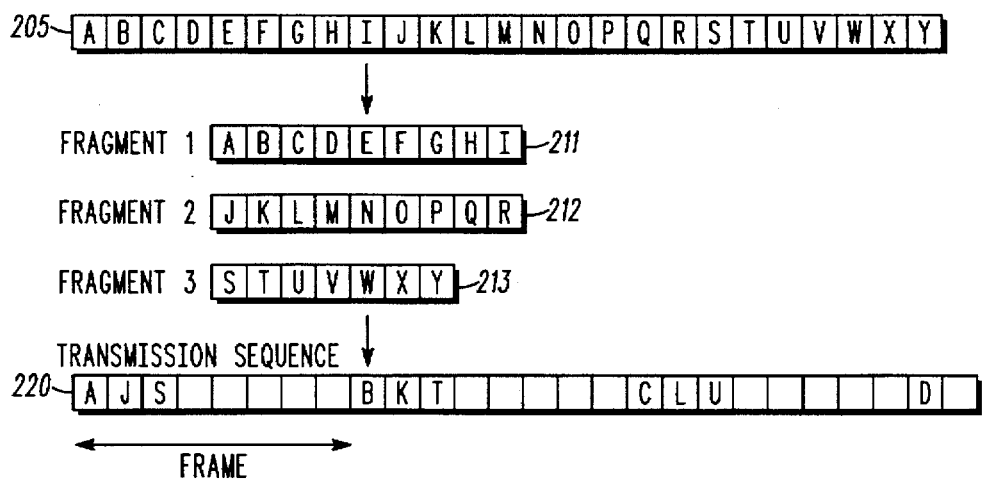
FIG. 2 is a diagram illustrating a MAC layer packet fragmentation and interleaving according to the first embodiment of the invention.
Figure 3:
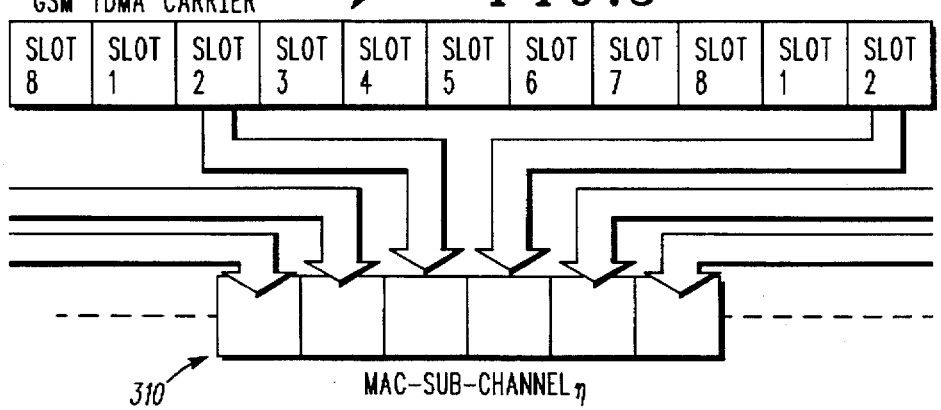
FIG. 3 is a diagram illustrating a MAC layer subchannel structure.

The operation of this system can be further understood by additional reference now to FIGS. 2 and 3. FIG. 2 illustrates a fragmentation/multiplexing process according to an embodiment of the present invention. A user packet 205 can be logically considered a series of MAC layer PDUs (packet data units). In the case of GPRS, the length of each PDU is determined by the amount of data capable of transmission in a single burst/time slot period. Thus, in a prior art approach a first PDU "A" would be sent in a first time slot of a first frame (each frame having 8 time slots), the second PDU "B" would be sent in the first time slot of the second frame, and so on until all PDUs are sent. Since this approach has limited bandwidth, another approach proposed is that of assigning plural time slots and sequentially transmitting the PDUs. Thus, for example, if time slots 1 and 2 were assigned, PDU "A" would be sent in time slot 1 of frame 1, PDU "B" in time slot 2 of frame 1, PDU "C" in time slot 1 of frame 2, and so on. The present embodiment improves on these approaches by further segmenting the packet 205 into plural SDUs (service data units, e.g., 211, 212 and 213), each SDU for transmission in a designated subchannel (as further shown by FIG. 3, where the PDUs being sent in time slot 2 of channel 305 make up a MAC layer subchannel SDU 310). Thus, the actual transmission sequence 220 in the illustrated case is SDU 211 in time slot 1, SDU 212 in time slot 2, and SDU 213 in time slot 3. In doing so, the PDUs are effectively interleaved, thus providing for greater immunity to fading while permitting increased throughput via multiple subchannels. Upon reception, the plural PDUs is defragmented and error corrected into a replica of the original data packet.

In a preferred approach to fragmenting the data packet, the requesting communication unit begins by determining the desired throughput rate (i.e., how many subchannels it wants to request) and fragments the packet 205 accordingly. This allows the subscriber to include, overhead permitting, the size of each SDU in the access request.

For simplified operations, an access request is sent on each desired subchannel. For example, where the base station broadcast information indicates that time slots 1–3 of a communications resource/channel are available for GPRS service, a subscriber wanting high throughput would fragment its data packet into 3 SDUs and send an access request on all three time slots. When received by the infrastructure, e.g., at scheduler 117 of BSC 115, a determination is made on whether to grant access to each subchannel. Where the data packet has higher priority than any other pending access requests, a scheduling message is sent to the channel controller 116 allocating all three subchannels and the subscriber is notified by allocation messages on the respective subchannels.

On the other hand, where the data packet only has the highest priority on subchannels 1 and 2, an allocation of only these subchannels would be made. The remaining subchannel would be allocated to a higher priority message, and an allocation for the SDU for slot 3 deferred; alternatively the access request could be denied, allowing the subscriber to attempt a further allocation on subchannels 1–2, or possibly a different channel, rather than wait a longer amount of time for the priority queue on subchannel 3 to be serviced.

In yet another approach, a single access request is sent requesting plural subchannels. In response scheduler 117 would either send back one allocation message, or, as in the first approach, separate allocation messages on each subchannel, with the subscriber scanning each possible subchannel (e.g., all GPRS available ones) to listen for its allocation(s). Upon receiving the allocation(s) of a number n designated subchannels, the subscriber then fragments the data packet into n data units and communicates each data unit via a respective one of the n designated subchannels. Because each subchannel may be deferred due to higher priority data, each subchannel transmission is preferably asynchronous with respect to the others.

Figure 4:
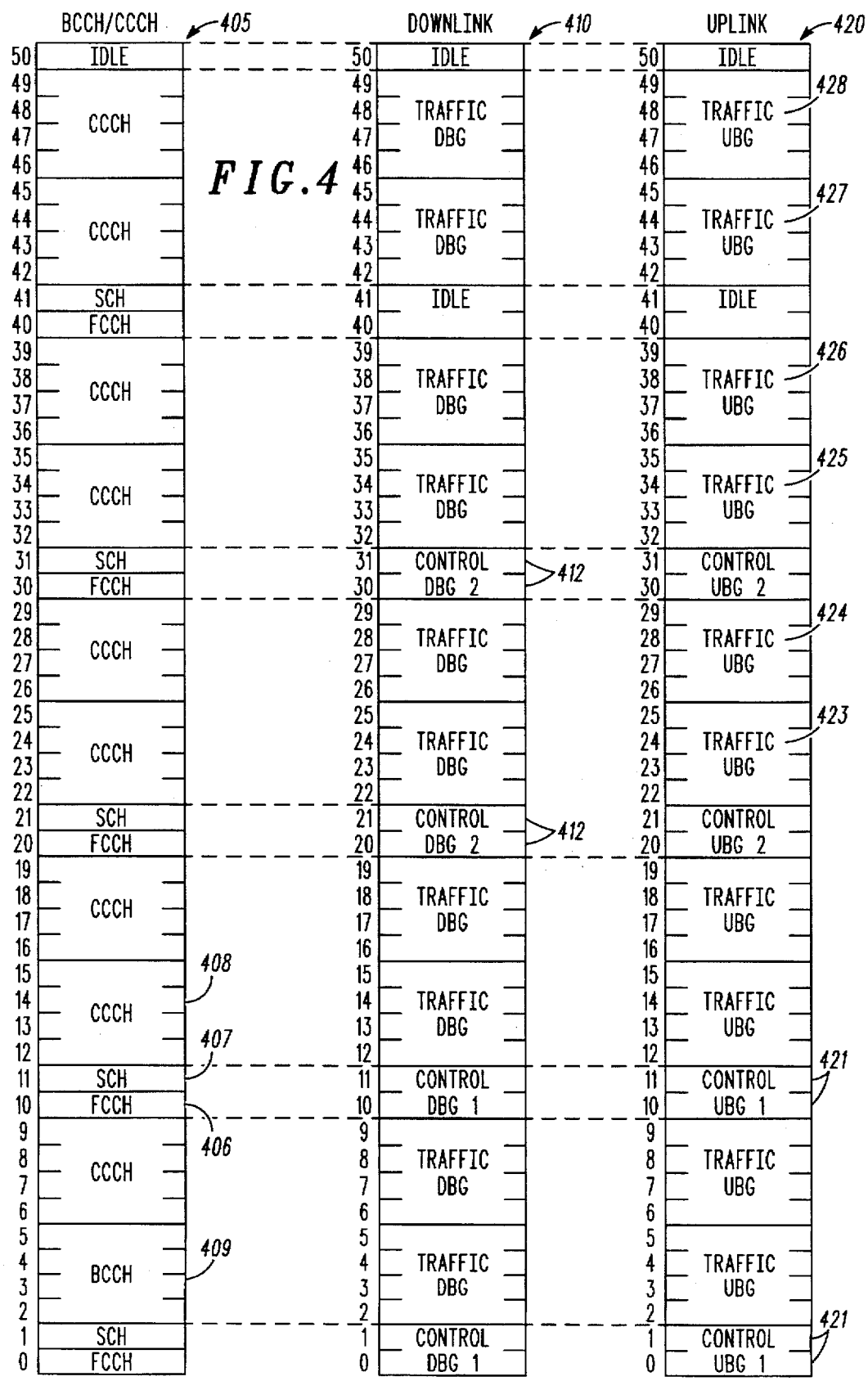
FIG. 4 is a diagram illustrating a multiframe structure according to a second embodiment of the invention.
Figure 5:
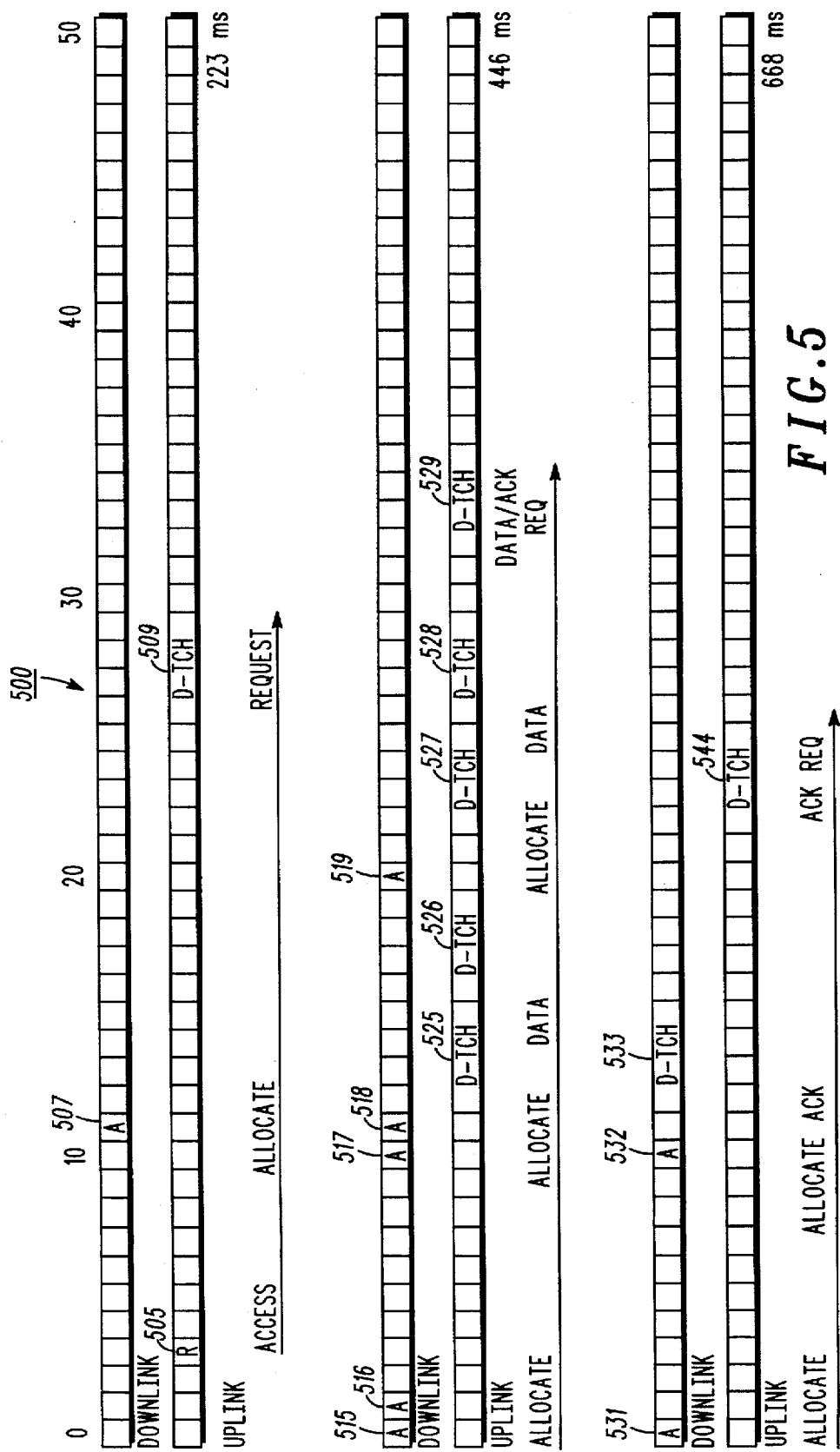
FIG. 5 is a diagram illustrating subchannel access and allocation according to the second embodiment of the invention.
Figure 6:
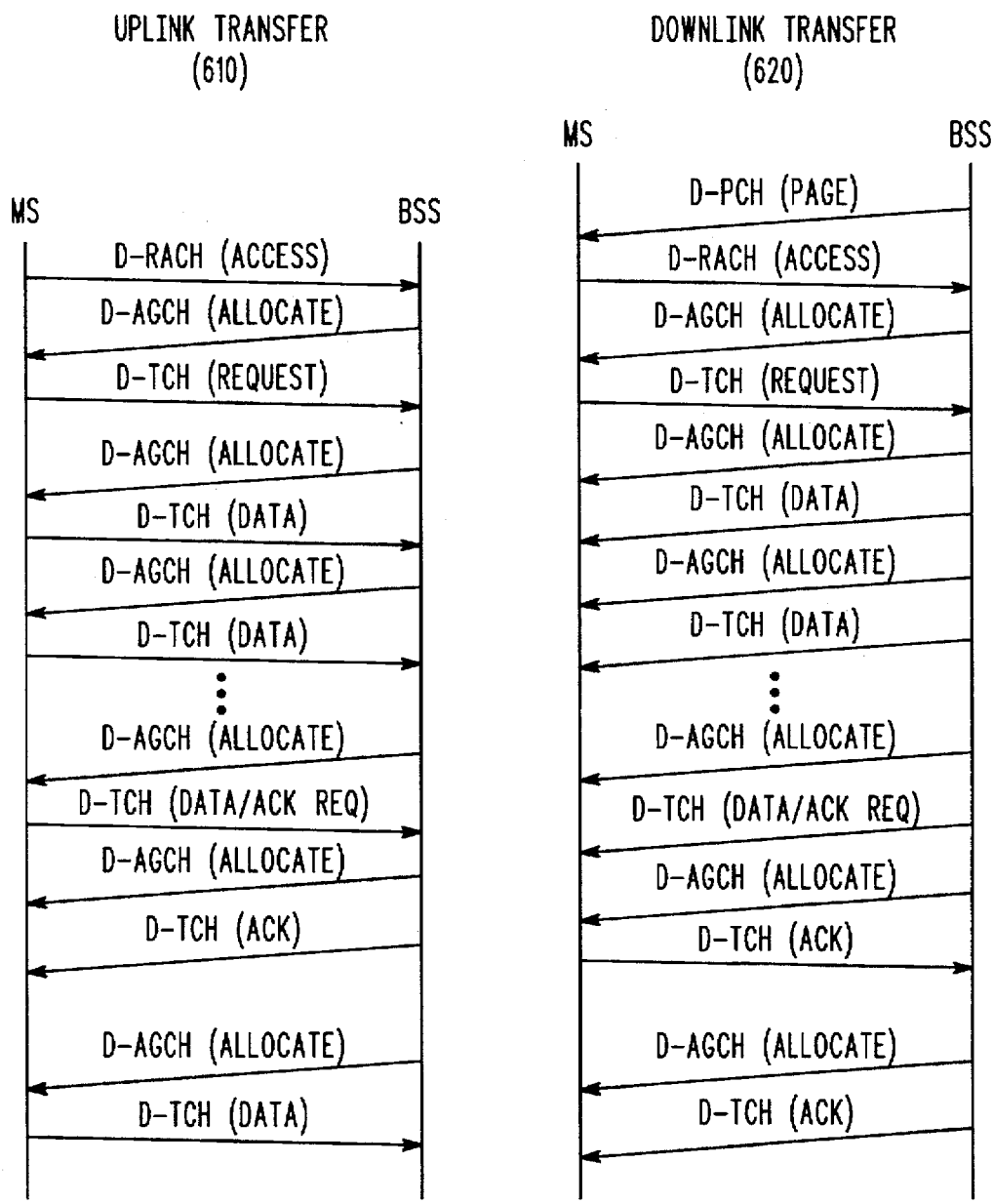
FIG. 6 is a diagram illustrating messaging for access and data transfer according to the second embodiment of the invention.

In another preferred embodiment of the invention each subchannel allocation is only made for a designated period of time, thus permitting reallocation of a subchannel to a higher priority data message. Referring to FIGS. 4–6, a multiframe channel structure is shown which may be used in implementing this feature. A GSM control channel multiframe 405 has 51 frames including BCCH (broadcast control channel) frames 409 and CCCH (common control channel) frames 408, FCCH (frequency control channel) frames 406 and SCH (synchronization channel) frames 407. A GPRS multiframe does not need to repeat the SCH and FCCH frames, so in the preferred embodiment of the invention these are replaced by control UBGs (uplink burst groups) for the uplink channel 410, control DBGs (downlink burst groups) for the downlink channel 420, and traffic burst groups. In the preferred approach for GPRS a MAC layer codeword (e.g., an error correction encoded packet data unit (PDU) of the original data packet) is additionally defined as a four frame burst group (i.e., it occupies 4 time slots, in which case the MAC layer PDU is typically the same as the burst group). Thus, time-synchronized and time division multiplexed uplink and downlink communications channels having repeating control and traffic communications periods are provided.

In this case, a typical messaging sequence 610 for an uplink data transfer would proceed as follows. Based on broadcast priority service parameters, the subscriber determines when to begin by sending a random access burst 505. Because a typical random access burst is limited in size, at best a limited priority indicator between two levels of service is possible during this initial access period (e.g., either distinguishing between highest priority data and all others, or between all priority data and "best efforts" data, depending on system design). Further information, such as a full priority indicator (i.e., indicating the specific grade of service requested) is thus typically needed in a supplementary access period. In this case, an allocation 507 of a single traffic UBG 509 is then made on a priority basis (unless the request is for non-priority data when only priority data is being serviced). This supplementary access request preferably includes information about the size of the SDU to be transferred, in addition to the priority indicator and other desirable information (such as identifiers, authentication information, a parameter including multiple subchannel transmission capability, etc.). Scheduler 117 receives the access request and, based upon channel/activity factors such as the priority level, number of other pending requests of similar or higher priority, size of the SDU(s), authentication results, a determination is made whether to allocate traffic subchannel(s). Upon determination that the request has the highest priority, for example by comparing priority levels or FIFO (first in first out) within the same grade, an allocation is sent via the control DBGs, e.g. during frames 515–519, each such frame corresponding to a traffic burst group 525–529, respectively. Upon monitoring for and receiving the allocation(s), the subscriber communicates the PDU via the designated burst groups. Similar allocation/communication is done for downlink data transfers 620 (the main difference being initiation via a downlink paging signal), and on other subchannels in the event plural subchannels are requested and allocated. Finally, upon receipt of the acknowledgment request and error correction, as needed, further allocations 531, 532 are made for transmission of an ACK (acknowledgment) during traffic DBG 533 and response during traffic UBG 544.

In the case where traffic UBGs were being allocated to a first data traffic having, say, priority 3, but the base station is monitoring for and receives an access request for second data traffic having a higher priority 2, this multiframe control structure advantageously allows scheduler 117 to defer completion of the first user's data transfer (i.e., only send a first portion) until after the second user's data is sent. If the second user's data only consists of three codewords, scheduler 117 can allocate the next three traffic UBGs to the second user, and reallocate the subsequent traffic UBGs to the first user to finish sending a further portion of its data packet. One skilled in the art will recognize that this multiframe structure can be readily altered based upon the design factors for any given system. What is significant for this particular embodiment is that allocations are made only for a limited portion of the resource (e.g., a limited period of time such as a maximum number of burst groups), following which another allocation is made—either for the same data, or a new, higher priority data packet.

Figure 7:
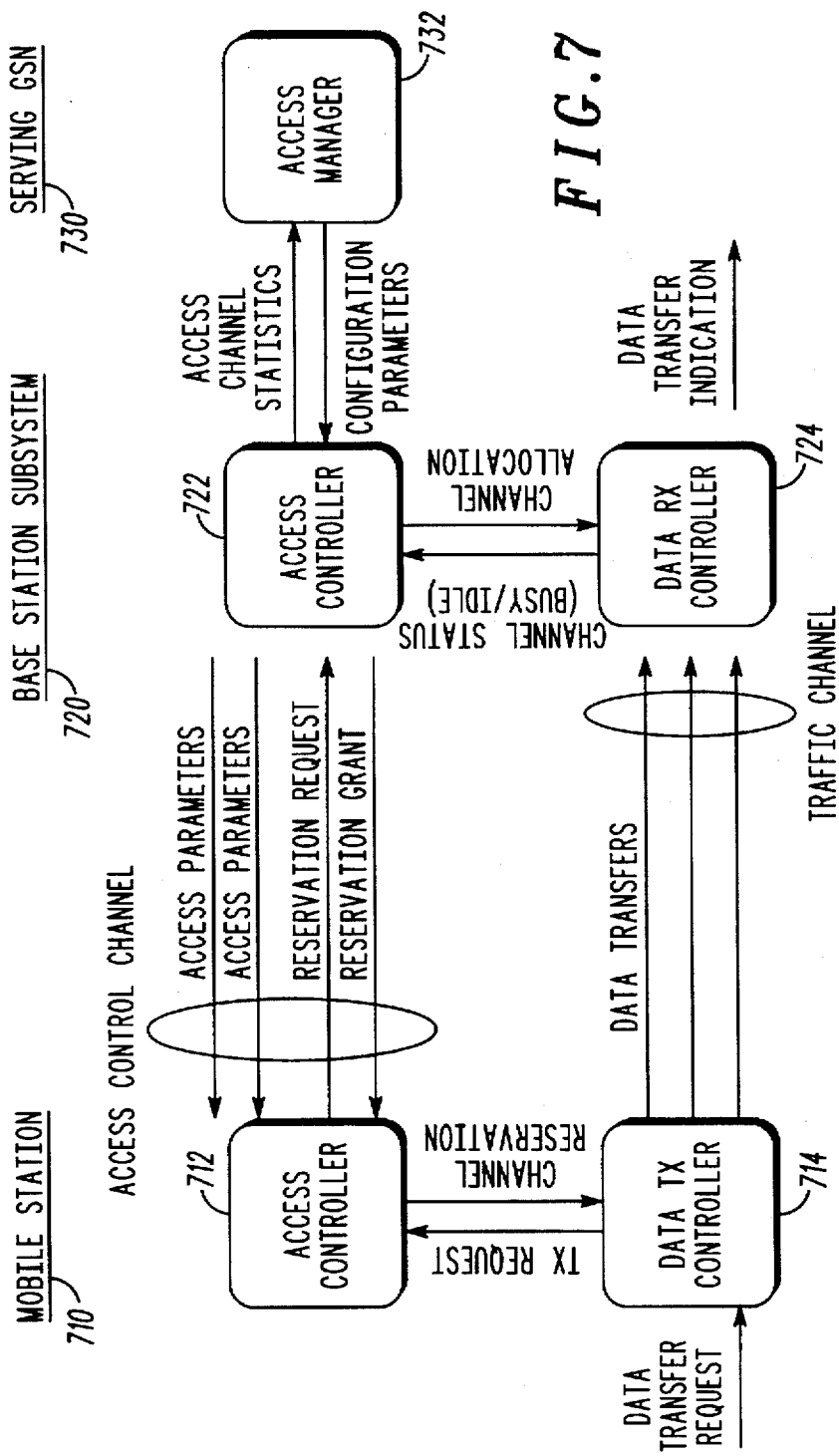
FIG. 7 is a further diagram illustrating messaging between different functional entities of the wireless communications system of FIG. 1.

Turning to FIG. 7 and 8, the access control and data transfer functions of the preferred embodiment are further illustrated. In FIG. 7, the control/traffic communications flow among the MS 710, BS subsystem 720 and GSN 730 is generally depicted. Both MS 710 and BS/BSC 720 include access controllers (712 and 722 respectively) and data transmission controllers (714 and 724 respectively), which GSN 730 includes an access manager 732. Current configuration parameters, including loading and service priority information derived from usage and access channel statistics, is communicated between the GSN 730 and BS/BSC access controller 722. Based on this information access control parameters are determined and broadcast via the BS to MSs in the BS service area. These access parameters are preferably the current service priority level and access probability parameters. When the MS data transmission controller 714 receives a data transfer request, a transmission request message is transferred to the access controller 712 (i.e., moving from state 810 to monitor state 820 of FIG. 8). Based on the access control parameters and its data message priority, MS access controller 712 determines whether to send an access request (state 830) or backoff (state 825), and BS/BSC access controller 722 determines whether to allocate communications resource(s) in response to such a request. After a time-out period and no response, MS 710 again retries access (state 835). Upon allocation, access controller 722 notifies both MS 710 and data receiver controller 724 of the subchannel allocation, and the data transmitter controller 714 and data receiver controller 724 commence transfer of the data (state 840).

In order to facilitate transfer of higher priority data, preferably two procedures are employed to limit MS access requests. The first is the broadcasting of a current service priority message. This message communicates a minimum QOS grade/priority for incoming traffic, so as to prevent more than peak loading of the access and/or traffic channels. Each MS having data to transfer determines in its processor the priority level of the data message, and inhibits any access request if the priority level is less than the current priority service level. If a subscriber wants to send traffic and a comparison of the priority service level for other subchannels shows that no subchannel is available at the specified grade of service, the subscriber may optionally chose to either automatically or via user input alter the data priority (and billing) level to a level high enough to permit access requests. Additionally, if other packets of higher priority are queued in the MS, the MS may chose to transmit the higher priority data packets ahead of a currently queued lower priority packet.

The second procedure is illustrated in FIGS. 9 and 10. Each MS having a qualifying priority level next determines whether to transmit during a current access period (e.g., an idle UBG traffic or control period) based on the received access control parameters. Preferably these parameters include a vector of access probability values $\{p_1, p_2, \ldots p_n\}$, each p value representing a p-persistence value corresponding to grade of service/priority levels 1 through n. The table of FIG. 10 illustrates one possible set of p-persistence values $P_n$. In this case, data having a priority level 1 has a p vector value of 0.05. Various means for broadcasting and applying the $p_n$ values may be used, with one such being as follows. In order to facilitate transmission of the $p_n$ values the closest integer $1/p_n (=w_n,$ or an access window period) is transmitted for each value in the vector. Upon selecting the value $w_n$ corresponding to the priority level of the data, an MS generates a random number between 1 and $w_n$ for an access delay value, and counts this value/number of allowed burst periods (i.e., data time slots available for access bursts) before transmitting its access/reservation request; counting is suspended during periods when the MS is not allowed access. Thus, as illustrated in FIG. 9, a priority level 1 packet will have a maximum wait period $t_1$ (901) substantially shorter than periods $t_2$ through $t_4$ (902–904) for priority levels 2 through 4. However, the actual burst period 905 at which an access request is sent could be the same for data traffic of all priority levels (at least those greater than the minimum priority level), although with differing probabilities of occurrence.

While the invention has been described in conjunction with specific embodiments thereof, it is evident that many alterations, modifications, and variations will be apparent to those skilled in the art in light of the foregoing description. For example, while processor 106, channel controller 116 and scheduler 117, and other circuits, are described in terms of specific logical/functional circuitry relationships, one skilled in the art will appreciate that such may be implemented in a variety of ways, such as appropriately configured and programmed processors, ASICs (application specific integrated circuits), and DSPs (digital signal processors). Further, the invention is not limited to the illustrated cellular systems, but has applicability to any wireless data system. Thus, it should be understood that the invention is not limited by the foregoing description of preferred embodiments, but embraces all such alterations, modifications, and variations in accordance with the spirit and scope of the appended claims.

We claim:

1. A method of communicating plural data packets via a wireless communications system, comprising the steps of:
   fragmenting a data packet into plural data units (PDUs);
   encoding each of the PDUs into encoded PDUs (E-PDUs);
   requesting plural subchannels of a communications resource for communicating the E-PDUs;
   receiving an allocation of at least one designated subchannel for a first period of time;
   receiving subsequent allocations of the at least one designated subchannel for subsequent periods of time, wherein all of the E-PDUs will have a period of time assigned for their communication; and
   communicating each of the E-PDUs via one of the at least one designated subchannels, wherein communicating during the first period of time a first E-PDU of the first PDU via the first designated subchannel and a second E-PDU of the first PDU via the second designated subchannel, until all the E-PDUs have been communicated via the designated subchannels.

2. The method of claim 1 wherein the step of fragmenting a data packet into plural data unit is based on the steps of:
   determining the desired throughput rate; and
   fragmenting the data packet accordingly.

3. The method of claim 1 wherein the communications resource comprises at least one radio channel multiplexed into plural subchannels using a code division multiple access protocol.

4. The method of claim 1 wherein the communications resource comprises at least one cellular digital packet data radio channel.

5. The method of claim 1, wherein each E-PDU is an error correction encoded codeword.

6. The method of claim 1 wherein the communications resource comprises at least one radio channel time division multiplexed into plural subchannels.

7. A method of communicating plural data packets via a wireless communications system, comprising the steps of:
   requesting an allocation of m plural subchannels of a communications resource for communicating a data packet;
   receiving an allocation of n designated subchannels, where n is a number between one and the m plural subchannels requested;
   fragmenting the data packet into n plural data units (n PDUs);
   encoding each of the n PDUs into n encoded plural data units (n E-PDUs); and
   communicating each of the n E-PDUs via one of the n designated subchannels until all of the n E-PDUs have been communicated.

8. The method of claim 7, wherein the step of requesting comprises the steps of:
   transmitting a first access request in a first time slot; and
   sending a supplementary access request in a second time slot, wherein a first parameter is included which indicates a capability of the requestor, such as, but not limited to, multiple subchannel transmission, the size of PDU to be transferred, identifiers, authentication information, grade of service requested and priority basis.

9. The method of claim 7, wherein the step of communicating includes communicating each of the n E-PDUs asynchronously with respect to each other.

10. An apparatus for communicating plural data packets via a wireless communications system, comprising:
    a transceiver; and
    a processor, coupled to the transceiver, appropriately programmed to perform at least the following functions:
    fragment a data packet into plural data units (PDUs),
    encode each of the PDUs into encoded PDUs (E-PDUs);
    request plural subchannels of a communications resource for communicating the E-PDUs;
    receive an allocation of at least one designated subchannel for a first period of time;
    receive subsequent allocations of the at least one designated subchannel for subsequent periods of time, wherein all of the E-PDUs will have a period of time assigned for their communication; and
    communicate each of the E-PDUs via one of the at least one designated subchannels, wherein communicating during the first period of time a first E-PDU of the first PDU via the first designated subchannel and a second E-PDU of the first PDU via the second designated subchannel, until all the E-PDUs have been communicated via the designated subchannels.

11. A method of communicating plural data packets via a wireless communications system, comprising the steps of:
    receiving a request for a subchannel allocation of a communications channel from a first requesting communication unit;
    transmitting an allocation of at least one subchannel to the first requesting communication unit;
    receiving a first portion of an encoded plural data unit (E-PDU) from the first requesting communication unit on the at least one subchannel;
    monitoring for higher priority requests for subchannel allocations of the communications channel from further communications units;
    transmitting, when no higher priority requests are received, a second allocation of at least one subchannel of the communications channel to the first requesting communication unit; and receiving a second portion of the E-PDU from the first requesting communication unit in response to the transmitted second allocation.

12. The method of claim 11, further comprising the steps of:

receiving a higher priority request from a second requesting communication unit;

deferring allocation to the first requesting communications unit of at least one subchannel of the communication channel;

allocating the at least one subchannel to the second requesting communication unit;

transmitting a further allocation of the at least one subchannel to the first requesting communications unit after receiving an E-PDU from the second requesting communication unit via the at least one subchannel; and receiving a second portion of the E-PDU from the first requesting communication unit in response to the transmitted further allocation.

* * * * *